US006276263B1

United States Patent
Huang (10) Patent No.: US 6,276,263 B1
(45) Date of Patent: Aug. 21, 2001

(54) GRILL DEVICE WITH AN UPPER GRILL UNIT CAPABLE OF BEING RETAINED AT A HALF-OPEN POSITION OR A HORIZONTAL FULLY-OPEN POSITION

(76) Inventor: Olivia Huang, No. 2, Alley 6, Lane 403, Sec. 3, Chung-Shan Rd., Wu-Tze Hsiang, Taichung Hsien (TW)

( * ) Notice: Subject to any disclaimer, the term of this patent is extended or adjusted under 35 U.S.C. 154(b) by 0 days.

(21) Appl. No.: 09/724,742

(22) Filed: Nov. 28, 2000

(51) Int. Cl.[7] .............. A47J 37/00; A47J 37/06
(52) U.S. Cl. .............. 99/375; 99/379; 99/380; 99/400; 99/425; 99/445; 99/446
(58) Field of Search ............ 99/400, 401, 372–384, 99/425, 444–450; 219/401, 524, 525, 521, 415, 386, 461; 126/369, 20; 426/523

(56) References Cited

U.S. PATENT DOCUMENTS

| 4,088,067 | * | 5/1978 | Kaebitzsch et al. | 99/379 |
| 4,178,500 | * | 12/1979 | Brindopke | 219/524 |
| 5,363,748 | * | 11/1994 | Boehm et al. | 99/372 |
| 5,606,905 | * | 3/1997 | Boehm et al. | 99/375 |
| 5,845,562 | * | 12/1998 | Deni et al. | 99/375 |
| 5,848,567 | * | 12/1998 | Chiang | 99/375 |
| 6,012,380 | * | 1/2000 | Hermansson | 99/379 X |
| 6,170,389 | * | 1/2001 | Brady | 99/400 X |

* cited by examiner

Primary Examiner—Timothy F. Simone
(74) Attorney, Agent, or Firm—Trop, Pruner & Hu, P.C.

(57) ABSTRACT

A grill device includes a horizontal upper grill unit with a rear side, a horizontal lower grill unit with a rear side, and a connecting unit. The upper grill unit is superposed on the lower grill unit. The connecting unit interconnects the rear sides of the upper and lower grill units in such a manner that the upper grill unit can be turned rearward from the lower grill unit to a half-open position and to a horizontal fully-open position. When turned to the half-open position, the upper grill unit is retained automatically thereat unless it is pulled upwardly relative to the lower grill unit.

5 Claims, 10 Drawing Sheets

GRILL DEVICE WITH AN UPPER GRILL UNIT CAPABLE OF BEING RETAINED AT A HALF-OPEN POSITION OR A HORIZONTAL FULLY-OPEN POSITION

BACKGROUND OF THE INVENTION

1. Field of the Invention

The invention relates to a grill device, more particularly to a grill device with an upper grill unit capable of being retained at a half-open position or a horizontal fully-open position.

2. Description of the Related Art

Figure 1:
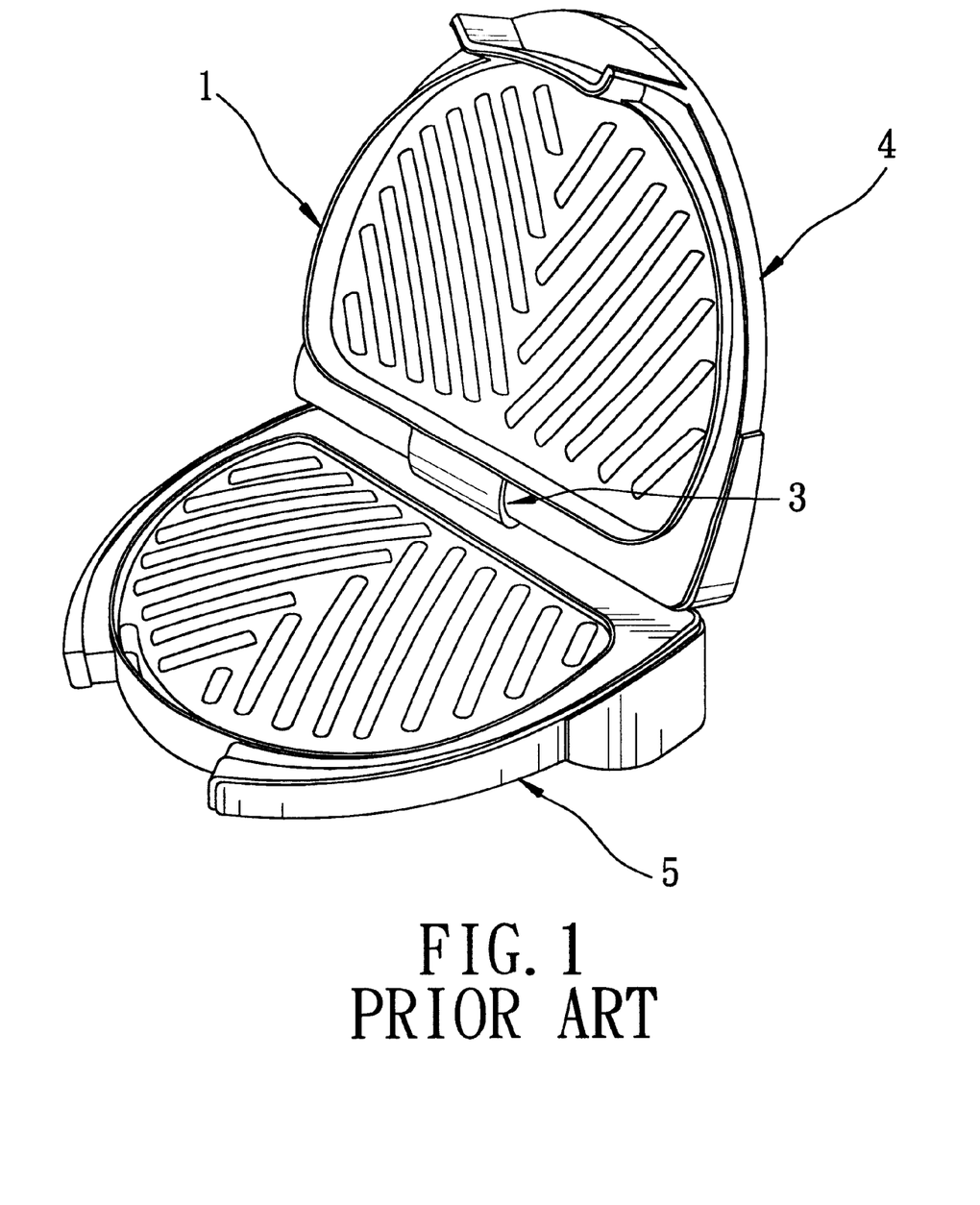
FIG. 1 is a perspective view of a conventional grilling device at a half-open position.
Figure 2:
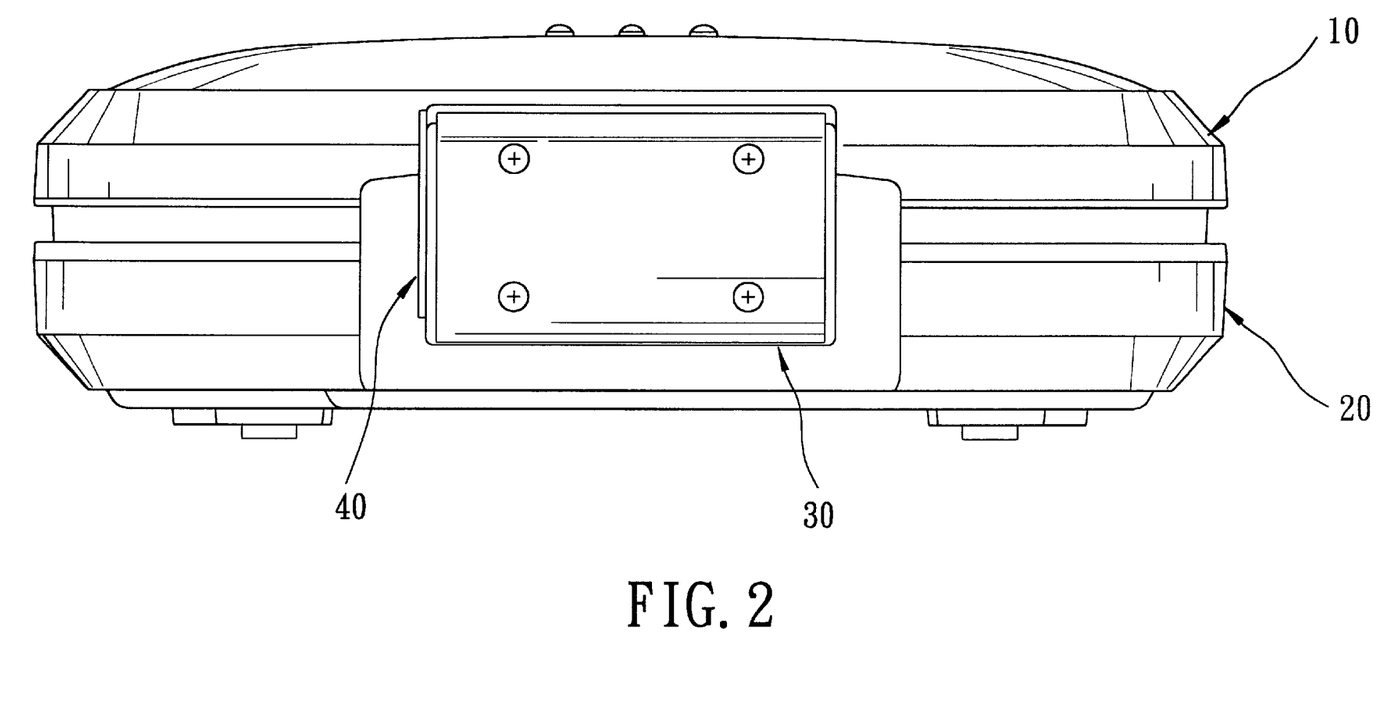
FIG. 2 is a rear side view of the preferred embodiment of a grill device of the present invention.

Referring to FIG. 1, a conventional grill device 1 is shown to include a lower grill unit 5 with a rear side, an upper grill unit 4 with a rear side, and a connecting unit 3 which interconnects the rear sides of the upper and lower grill units 4,5 in such a manner that the upper grill unit 4 can be turned rearward from the lower grill unit 5 to a half-open position, in which a surface of the upper grill unit 4 abuts against a corner edge of the lower grill unit 5 so as to position the upper grill unit 4 on the lower grill unit 5.

In order to grill a meat confined therebetween, the upper and lower grill units 4,5 are provided with upper and lower cooking members.

It is noted that the grilling range of the conventional grill device is limited, since the upper grill unit 4 is unable to turn to a horizontal fully-open position relative to the lower grill unit 5.

SUMMARY OF THE INVENTION

The object of this invention is to provide a grill device having an upper grill unit which is adapted to be retained at a half-open position or a horizontal fully-open position with respect to a lower grill unit.

Accordingly, a grill device of the present invention includes a horizontal upper grill unit with a rear side, a horizontal lower grill unit with a rear side, and a connecting unit. The upper grill unit is superposed on the lower grill unit. The connecting unit interconnects the rear sides of the upper and lower grill units in such a manner that the upper grill unit can be turned rearward from the lower grill unit to a half-open position. The lower grill unit has a top that is provided with a lower cooking member. The upper grill unit has a bottom that is provided with an upper cooking member. The rear side of the upper grill unit has an upper notch, an upper abutment face that defines a front end of the upper notch, and two aligned upper pivot pins that are fixed in the upper notch and that are spaced apart from each other. The rear side of the lower grill unit has a lower notch, a lower abutment face that defines a front end of the lower notch, and two aligned lower pivot pins that are fixed in two sides of the lower notch and that are spaced apart from each other. The connecting unit includes a connecting block which has two elongated side surfaces. Each of the side surfaces of the connecting block has an upper portion that is formed with a pivot hole, and a lower portion that is formed with a vertical longitudinal slide slot. The upper pivot pins of the upper grill unit engage fittingly the pivot holes in the connecting block. The lower pivot pins of the lower grill unit are received slidably within the slide slots in the connecting block. The lower portion of the connecting block abuts against the lower abutment face of the lower grill unit so as to prevent rotation of the connecting block about the lower pivot pins while permit permitting rearward turning of the upper grill unit about the upper pivot pins to the half-open position, where the upper portion of the connecting block abuts against the upper abutment face of the upper grill unit so as to prevent further rearward turning of upper grill unit about the upper pivot pins. The slide slots in the connecting block respectively have a length so that, when the upper grill unit is pulled upward on the lower grill unit so as to move the lower pivot pins to lower ends of the slide slots in the connecting block, the lower portion of the connecting block separates from the lower abutment face of the lower grill unit, thereby permitting rearward turning of the upper grill unit to a horizontal fully-open position, where the upper and lower grill units are coplanar and where the upper cooking member of the upper grill unit faces upward. At the fully-open position, the cooking members of the grill device of the present invention provide a larger grilling space than that of the conventional grill device.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 3:
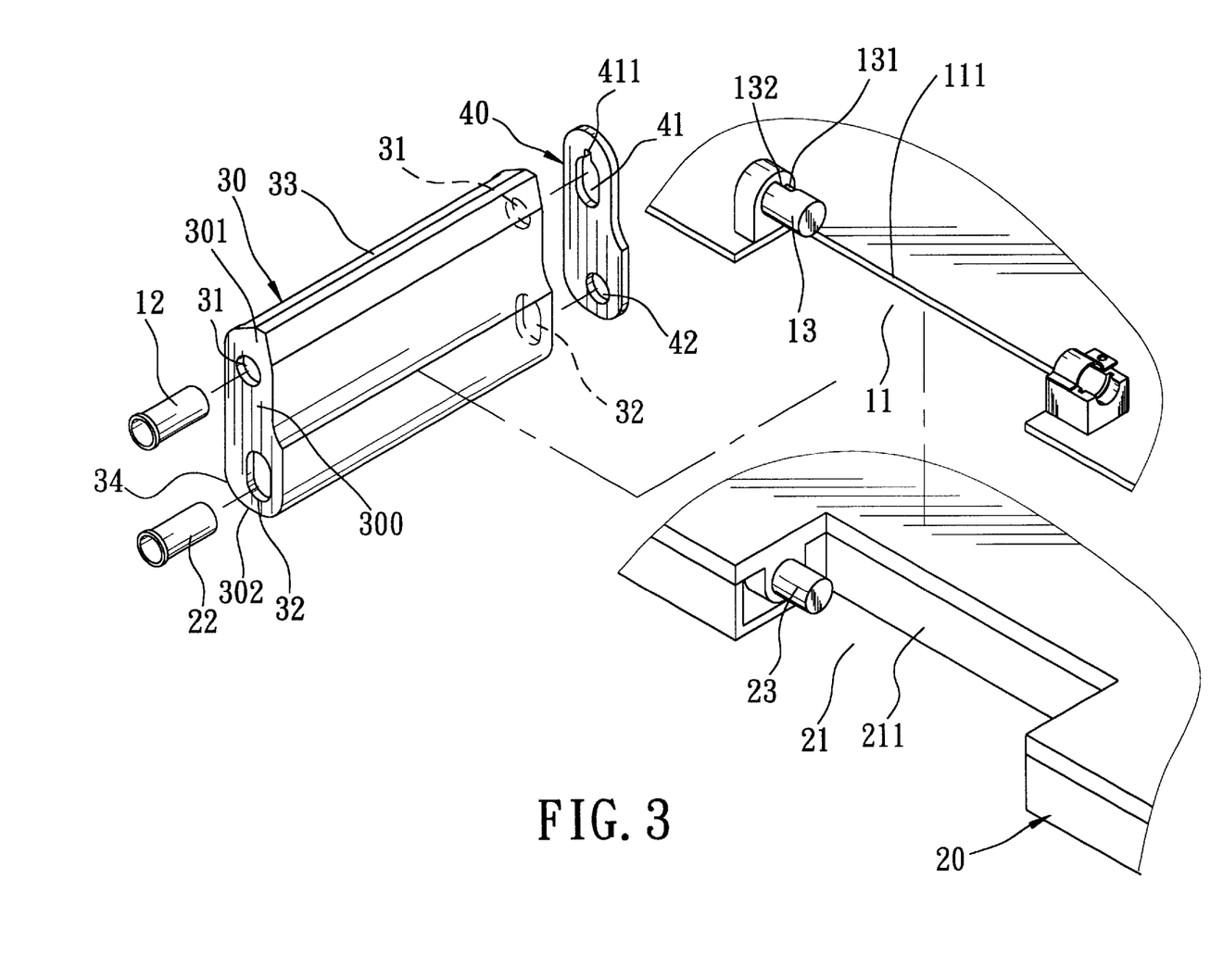
FIG. 3 is an exploded and fragmentary view of the preferred embodiment shown in FIG. 2.
Figure 4:
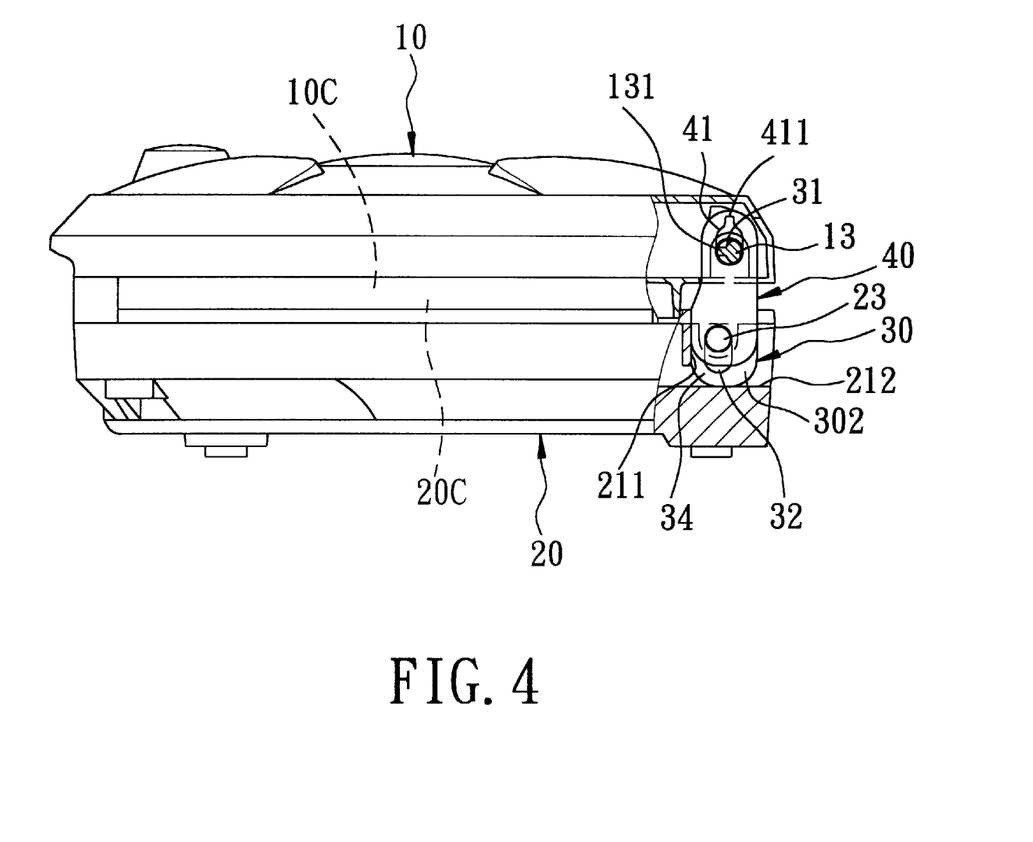
FIG. 4 is a left side view of the preferred embodiment, a rear part of which is sectioned to illustrate how upper and lower grill units are connected to each other.
Figure 5:
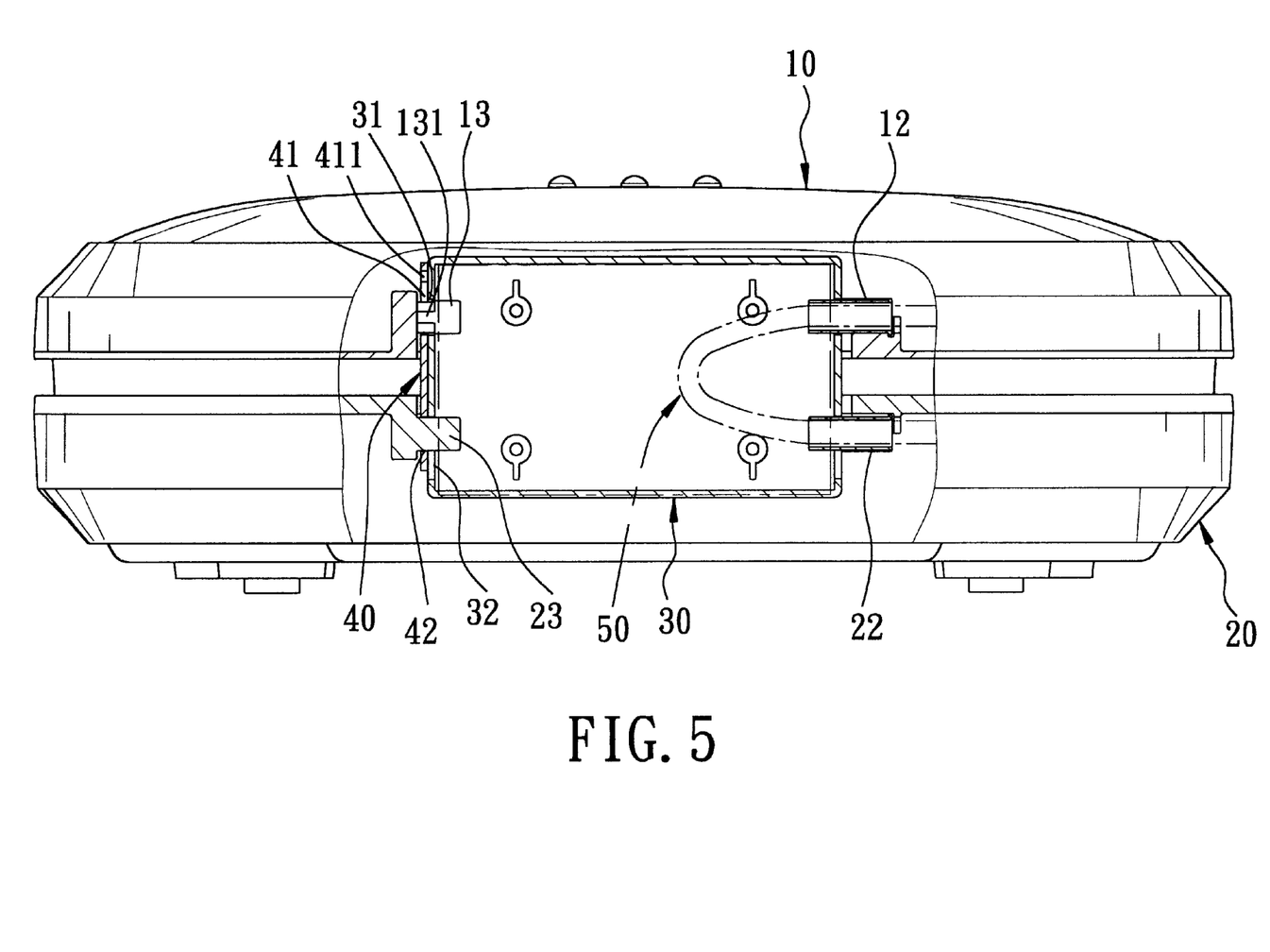
FIG. 5 is a rear view of the preferred embodiment, the rear part of which is partly sectioned to illustrate how the upper and lower grill units are connected to each other.

Referring to FIGS. 3 to 5, the preferred embodiment of a grill device of this invention is shown to include a horizontal upper grill unit 10 with a rear side, ahorizontal lower grill unit 20 with a rear side, and a connecting unit.

Figure 8:
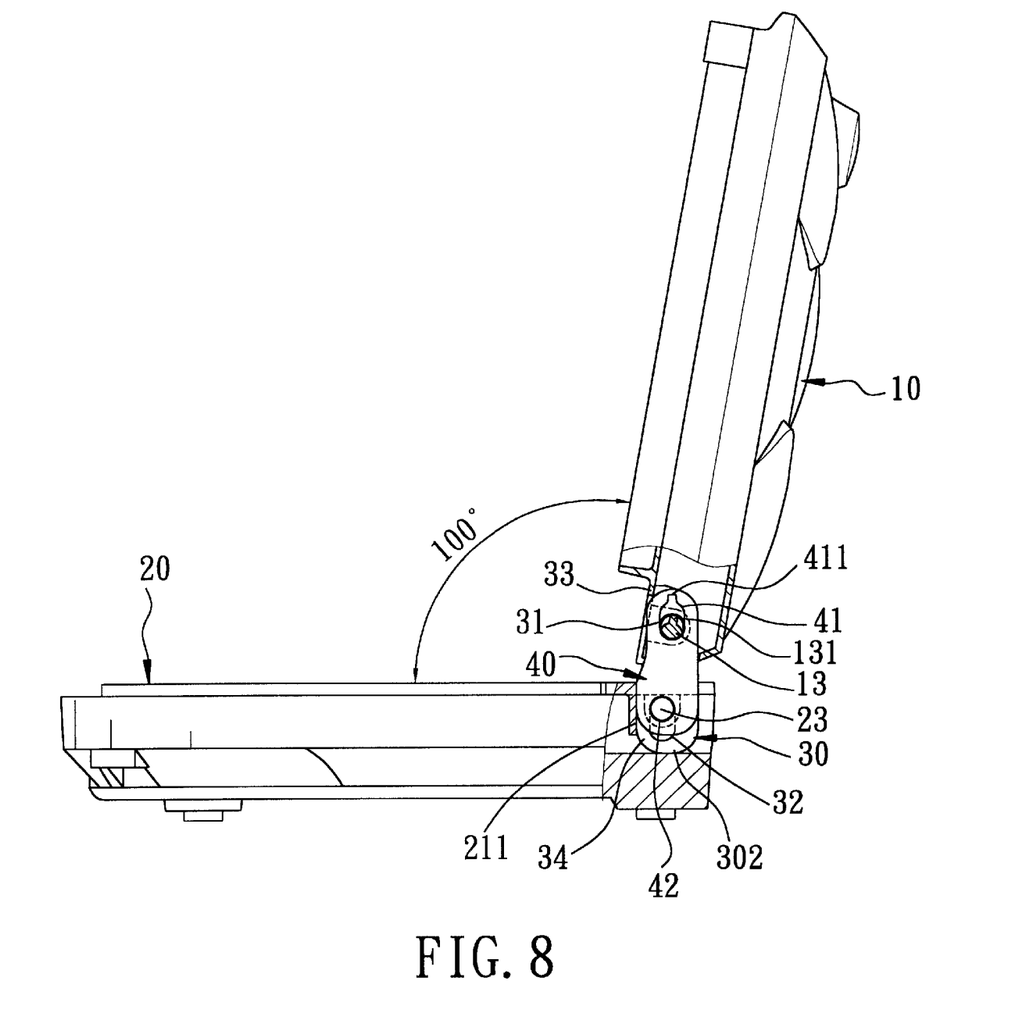
FIG. 8 is a left side view of the preferred embodiment at a half-open position, the rear part thereof is sectioned to illustrate how the upper grill unit is retained at the half-open position relative to the lower grill unit.

As illustrated, the upper grill unit 10 is superposed on the lower grill unit 20. The connecting unit interconnects the rear sides of the upper and lower grill units 10,20 in such a manner that the upper grill unit 10 can be turned rearward from the lower grill unit 20 to a half-open position, as best shown in FIG. 8, the consequence of which will be detailed in the succeeding paragraphs.

The lower grill unit 20 has a top that is provided with a lower cooking member (20C). The rear side of the lower grill unit 20 has a lower notch 21, a lower abutment face 211 that defines a front end of the lower notch 21, and two aligned lower pivot pins 22, 23 that are fixed in two sides of the lower notch 21 and that are spaced apart from each other.

The upper grill unit 10 has a bottom that is provided with an upper cooking member (10C). The rear side of the upper grill unit 10 has an upper notch 11, an upper abutment face 111 that defines a front end of the upper notch 11, and two aligned upper pivot pins 12, 13 that are fixed in the upper notch 11 and that are spaced apart from each other.

The connecting unit includes a connecting block 30 which has two elongated side surfaces 300. Each of the side surfaces 300 of the connecting block 30 has an upper portion 301 that is formed with a pivot hole 31, and a lower portion 302 that is formed with a vertical longitudinal slide slot 32. The upper pivot pins 13 of the upper grill unit 10 engage fittingly the pivot holes 31 in the connecting block 30. The lower pivot pins 23 of the lower grill unit 20 are received slidably within upper ends of the slide slots 32 in the connecting block 30.

The upper and lower pivot pins 12, 22 are disposed at one side surface 300 of the connecting block 30 and are shaped as hollow tubes, each of which has two open ends so as to permit extension of an electrical cable 50 therethrough. Since how the cable 50 interconnects the upper and lower cooking members (10C,20C) electrically is not pertinent to the present invention, a detailed description of the same is omitted herein for the sake of brevity.

Figure 6:
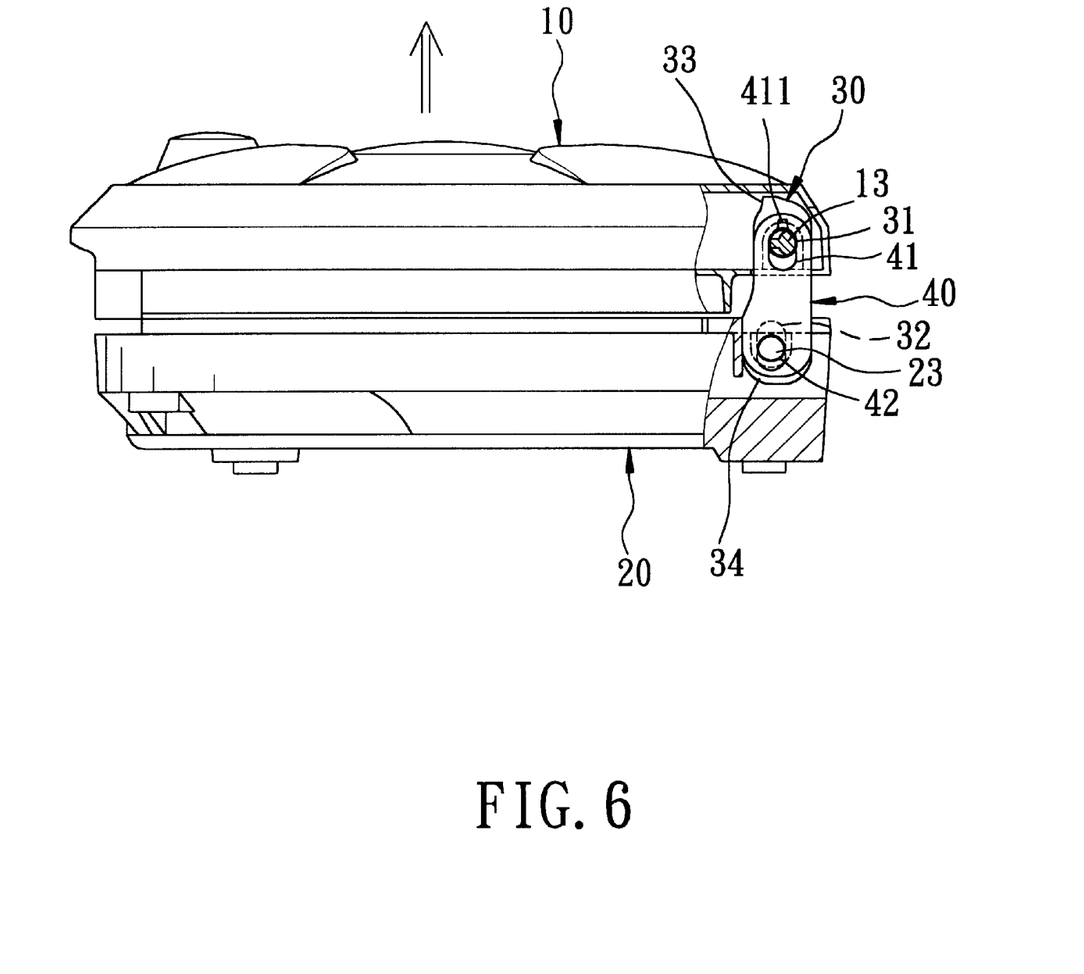
FIG. 6 is a left side view of the preferred embodiment, a rear part of which is sectioned to illustrate how the upper grill unit is raised relative to the lower grill unit.
Figure 7:
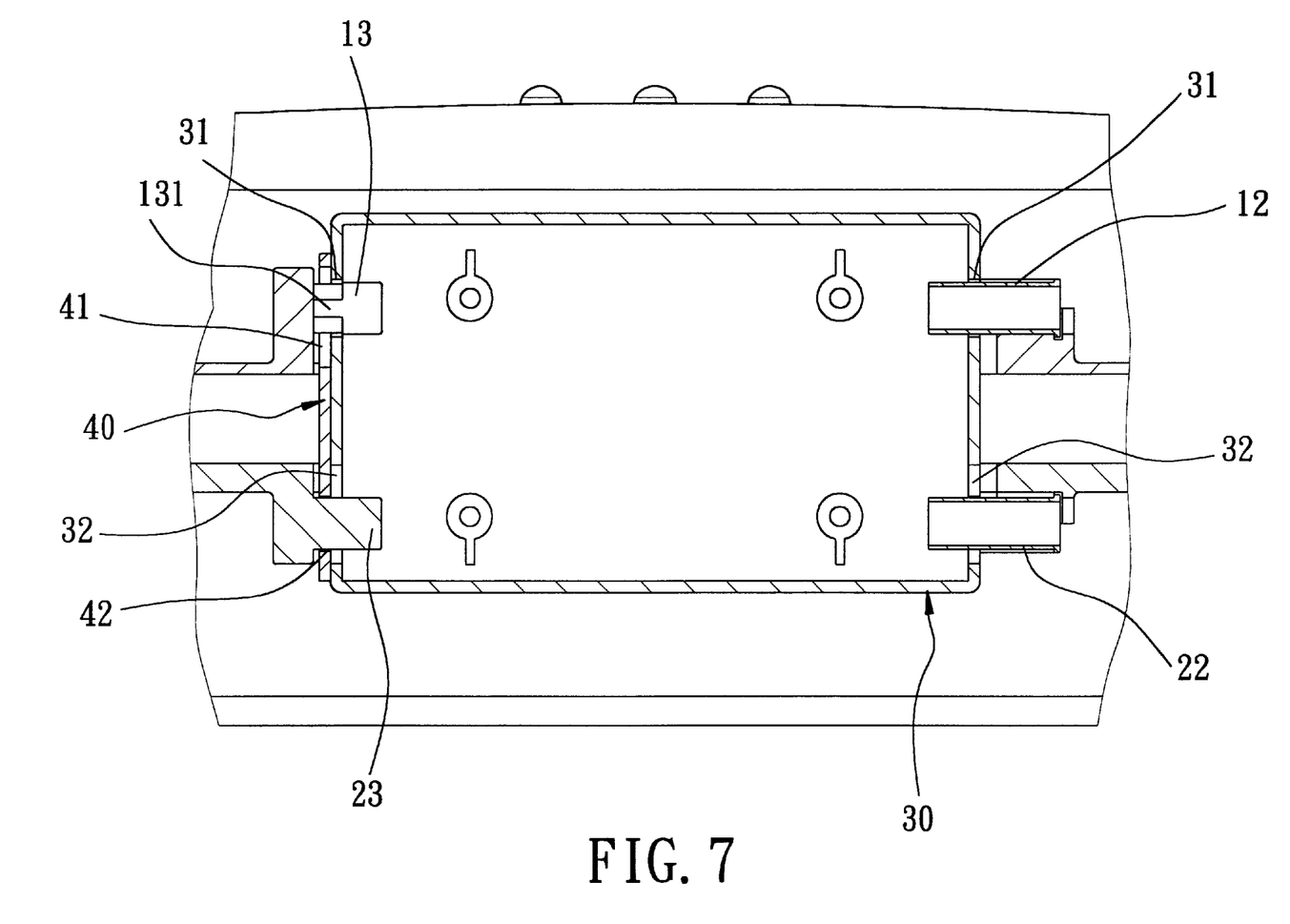
FIG. 7 is a fragmentary and sectional rear view of the preferred embodiment shown in FIG. 6, illustrating how the upper grill unit is raised relative to the lower grill unit by virtue of a connecting block disposed between the upper and lower grill units.

Referring to FIGS. 6 and 7, the lengths of the slide slots 32 in the connecting block 30 are chosen in such a manner that, in case a relatively thick piece of meat (not shown) is placed between the cooking members (10C,20C) of the upper and lower grill units 10,20 for grilling therebetween, the piece of meat will force the upper grill unit 10 to move upward by virtue of downward movement of the lower pivot pins 23,22 within the slide slots 32,41 in the connecting block 30. In this preferred embodiment, the slide slots 32 of the connecting block 30 are sized in such a manner to permit upward movement of the upper grill unit 10 of about 8 mm relative to the lower grill unit 20.

Referring to FIG. 8, when the upper grill unit 10 is at the half-open position, the lower portion 302 of the connecting block 30 abuts against the lower abutment face 211 of the lower grill unit 20 so as to prevent rotation of the connecting block 30 about the lower pivot pins 22, 23. In this position, the upper grill unit 10 is permitted to turnabout the upper pivot pins 13 in a rearward direction so as to dispose the same at an angle of about 100° with respect to the lower grill unit 20, where the upper portion 301 of the connecting block 30 abuts against the upper abutment face 111 of the upper grill unit 10 so as to prevent further rearward turning of the upper grill unit 10 about the upper pivot pins 12, 13. Preferably, the upper portion 301 of the connecting block 30 is formed with an inclined face 33 that abuts against the upper abutment face 111 of the upper grill unit 10 when the upper grill unit 10 is disposed at the half-open position. The lower grill unit 20 further has a horizontal face 212 (see FIG. 4) under the lower notch 21. The lower portion 302 of the connecting block 30 has a rounded lower edge that abuts against the horizontal face 212 of the lower grill unit 20 (see FIG. 4). A vertical connecting plate 40 is disposed at the left side surface of the connecting block 30 in such a manner that the connecting plate 40 abuts against the left side surface 300 of the connecting block 30. The connecting plate 40 has a vertically extending slide slot 41 that is aligned with a corresponding one of the pivot holes 31 in the connecting block 30 for extension of a corresponding one of the upper pivot pins 12, 13 therethrough, and a pivot hole 42 that is aligned with a corresponding one of the slide slots 32 in the connecting block 30 for extension of a corresponding one of the lower pivot pins 22, 23 therethrough. The slide slot 41 in the connecting plate 40 has a narrowed upper end 411 that serves as a keyway. The corresponding one of the upper pivot pins 13 has a cavity 131 and an upwardly extending key 132 that is formed in the cavity 131 and that engages the narrowed upper end 411 of the slide slot 41 in the connecting plate 40 so as to prevent relative rotation between the upper grill unit 10 and the connecting plate 40 and between the connecting plate 40 and the connecting block 30 during rotation of the upper grill unit 10 relative to the lower grill unit 20 from the half-open position to a fully-open position, where the upper and lower grill units 10,20 are coplanar and where the upper cooking member 10C faces upward.

Figure 9:
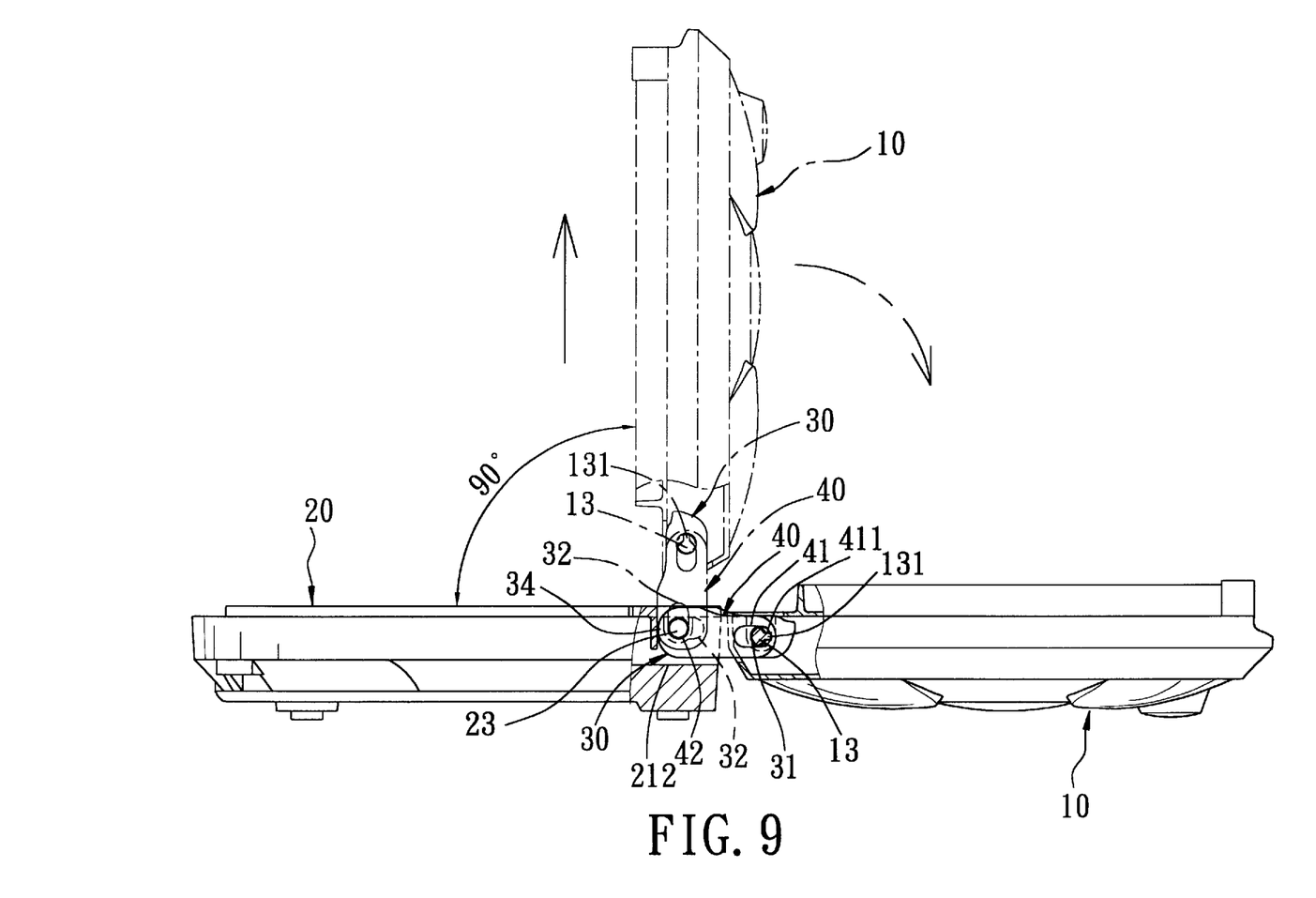
FIG. 9 is a side view of the preferred embodiment, illustrating how the upper grill unit of the preferred embodiment is lifted upward and then turned from the half-open position to a horizontal fully-open position.
Figure 10:
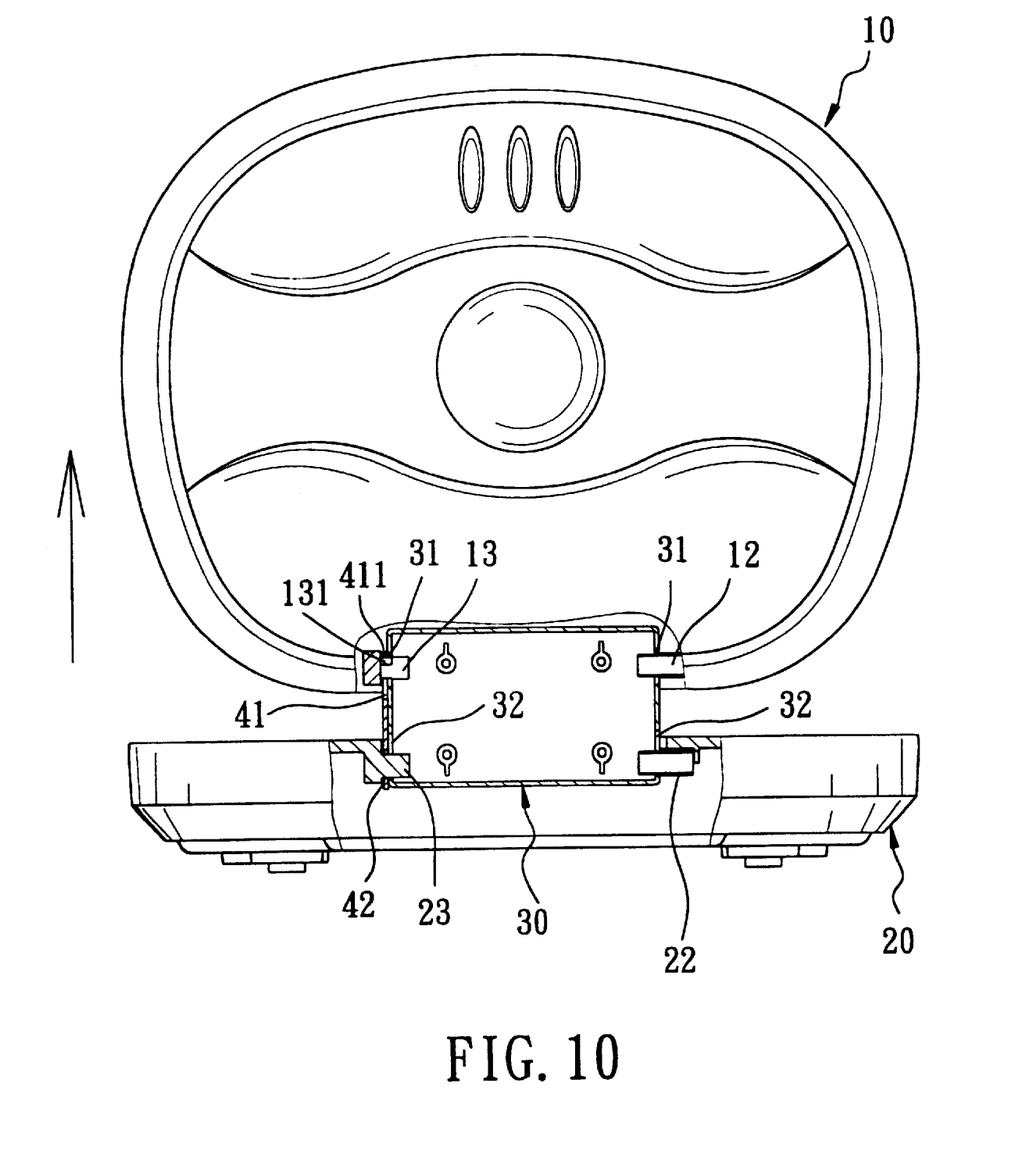
FIG. 10 is a rear view of the preferred embodiment, a portion of which is sectioned to illustrate lifting of the upper grill unit upward from the half-open position in order to turn the upper grill unit to the fully-open position shown in FIG. 9.

Referring to FIGS. 9 and 10, when it is desired to turn the upper grill unit 10 to the horizontal fully-open position, the upper grill unit 10 is rotated about the upper pivot pins 12,13 to avertical position. Then, the upper grill unit 10 is pulled upwardly away relative to the lower grill unit 20 in a direction shown by the solid arrowheads in FIGS. 9 and 10. At this time, because the lower pivot pins s22,23 of the lower grill unit 20 engages fittingly the pivot holes 42 in the connecting plate 40, the connecting plate 40 cannot move upward relative to the lower grill unit 20. In addition, because the upper pivot pins 12,13 engage fittingly the pivot holes 31 in the connecting block 30, the connecting block 30 moves synchronously and upwardly with the upper grill unit 10 away from the lower grill unit 20 to the position shown by the phantom lines in FIG. 9. During the upward movement of the upper grill unit 10, the upper pivot pin 13 moves from the lower end of the slide slot 41 in the connecting plate 40 to the upper end of the same so as to engage the key 132 of the upper pivot pin 13 with the keyway 411 in the connecting plate 40, while the lower pivot pin 23 of the lower grill unit 20 moves from the upper end of the slide slot 32 in the connecting block 30 to the lower end of the same. Under this condition, the connecting plate 40 cannot rotate relative to the upper grill unit 10 and the connecting block 30, thereby permitting rotation of an assembly of the upper grill unit 10, the connecting block 30 and the connecting plate 40 about the lower pivot pins 22,23 to the horizontal fully-open position in a direction shown by the phantom arrowhead in FIG. 9.

With this invention thus explained, it is apparent that numerous modifications and variations can be made without departing from the scope and spirit of this invention. It is therefore intended that this invention be limited only as indicated in the appended claims.

I claim:

1. A grill device including a horizontal upper grill unit with a rear side, a horizontal lower grill unit with a rear side, and a connecting unit, said upper grill unit being superposed on said lower grill unit, said connecting unit interconnecting said rear sides of said upper and lower grill units in such a manner that said upper grill unit can be turned rearward from said lower grill unit to a half-open position, said lower grill unit having a top that is provided with a lower cooking member, said upper grill unit having a bottom that is provided with an upper cooking member, wherein the improvement comprises:

said rear side of said upper grill unit having an upper notch, an upper abutment face defining a front end of said upper notch, and two aligned upper pivot pins that are fixed in said upper notch and that are spaced apart from each other;

said rear side of the lower grill unit having a lower notch, a lower abutment face defining a front end of said lower notch, and two aligned lower pivot pins that are fixed in two sides of said lower notch and that are spaced apart from each other; and said connecting unit including a connecting block which has two elongated side surfaces, each of said side surfaces having an upper portion that is formed with a pivot hole, and a lower portion that is formed with a vertical longitudinal slide slot, said upper pivot pins of said upper grill unit engaging fittingly said pivot holes in said connecting block, said lower pivot pins of said lower grill unit being received slidably within said slide slots in said connecting block, said lower portion of said connecting block abutting against said lower abutment face of said lower grill unit so as to prevent rotation of said connecting block about said lower pivot pins while permitting rearward turning of said upper grill unit about said upper pivot pins to said half-open position, where said upper portion of said connecting block abuts against said upper abutment face of said upper grill unit so as to prevent further rearward turning of said upper grill unit about said upper pivot pins, said slide slots in said connecting block having a length so that when said upper grill unit is pulled upward on said lower grill unit so as to move said lower pivot pins to lower ends of said slide slots in said connecting block, said lower portion of said connecting block separates from said lower abutment face of said lower grill unit, thereby permitting rearward turning of said upper grill unit to a horizontal fully-open position, where said upper and lower grill units are coplanar and where said upper cooking member of said upper grill unit faces upward.

2. The grill device as defined in claim 1, wherein each of one of said upper pivot pins and one of said lower pivot pins on one side of said connecting block is tubular, and has two open ends so as to be adapted to permit extension of an electrical cable therethrough.

3. The grill device as defined in claim 1, wherein said upper portion of said connecting block is formed with an inclined face that abuts against said upper abutment face of said upper grill unit when said upper grill unit is disposed at said half-open position.

4. The grill device as defined in claim 1, wherein said lower grill unit is formed with a horizontal face under said lower notch, said lower portion of said connecting block having a rounded lower edge that abuts against said horizontal face of said lower grill unit.

5. The grill device as defined in claim 1, wherein said connecting unit further includes a vertical connecting plate which abuts against one of said side surfaces of said connecting block, said connecting plate having a vertically extending slide slot that is aligned with a corresponding one of said pivot holes in said connecting block for extension of a corresponding one of said upper pivot pins therethrough, and a pivot hole that is aligned with a corresponding one of said slide slots in said connecting block for extension of a corresponding one of said lower pivot pins therethrough, said slide slot in said connecting plate having a narrowed upper end that serves as a keyway, said corresponding one of said upper pivot pins having a cavity and an upwardly extending key that is formed in said cavity and that engages said narrowed upper end of said slide slot in said connecting plate so as to prevent relative rotation between said upper grill unit and said connecting plate and between said connecting plate and said connecting block during rotation of said upper grill unit relative to said lower grill unit from said half-open position to said fully-open position.

* * * * *